(12) United States Patent
Fujiwara et al.

(10) Patent No.: US 6,349,956 B2
(45) Date of Patent: *Feb. 26, 2002

(54) BICYCLE

(75) Inventors: Nobuhiro Fujiwara; Atsushi Mamiya, both of Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/362,051

(22) Filed: Jul. 28, 1999

(30) Foreign Application Priority Data

Aug. 7, 1998 (JP) ............................. 10-224083

(51) Int. Cl.[7] ............................. B62M 1/02
(52) U.S. Cl. ..................... 280/253; 280/256
(58) Field of Search ................ 280/252, 253, 280/259, 256, 214; 277/634, 917

(56) References Cited

U.S. PATENT DOCUMENTS

| 1,427,589 | A | * | 8/1922 | Greenison | 280/253 |
|---|---|---|---|---|---|
| 1,505,271 | A | * | 8/1924 | McNeil | 280/253 |
| 1,577,585 | A | | 3/1926 | Motiglio | |
| 2,424,639 | A | | 7/1947 | Sobirai | |
| 3,984,129 | A | * | 10/1976 | Hege | 280/251 |
| 4,456,276 | A | | 6/1984 | Bortolin | |
| 4,577,879 | A | | 3/1986 | Vereyken | |
| 5,335,927 | A | * | 8/1994 | Islas | 280/255 |
| 6,000,292 | A | * | 12/1999 | Nagai et al. | 74/89.15 |

FOREIGN PATENT DOCUMENTS

| CA | 461815 | * | 12/1949 | 280/253 |
|---|---|---|---|---|
| DE | 3707669 | * | 9/1988 | 280/259 |
| EP | 978446 | * | 8/1999 | 280/253 |
| FR | 572338 | * | 9/1988 | 280/253 |

* cited by examiner

*Primary Examiner*—Robert P. Olszewski
*Assistant Examiner*—Michael Cuff
(74) *Attorney, Agent, or Firm*—Sonnenschein, Nath & Rosenthal

(57) ABSTRACT

This invention relates to a bicycle having a driving force transmitting mechanism with oscillating fulcrum point. A sliding part is provided with a dust cover or a brush to prevent dust and the like from being entered therein and to remove the dust, if entered, therefrom. When a rider steps on the pedals alternatively, force of the pedal levers generated by the oscillation of the pedal levers is transmitted to the sprocket through the crank lever. When the pedal levers oscillate, an oscillating fulcrum point of the pedal lever is moved in a lateral direction within the sliding part. The rotating force of the sprocket is transmitted to the rear wheel through a chain. Even if the locus Q of motion of the pedal is different in the first half period (a stepping-on period) and the second half period (a stepping-up period), a smooth movement of the pedal is assured. Such a smooth movement can be kept enough by the dust cover.

2 Claims, 12 Drawing Sheets

BICYCLE

RELATED APPLICATION DATA

The present application claims priority to Japanese Application No. P10-224083 filed Aug. 7, 1998 which application is incorporated herein by reference to the extent permitted by law.

BACKGROUND OF THE INVENTION

1. Technical Field

This invention relates generally to a bicycle having a rotating force transmitting mechanism with an oscillating fulcrum point. More particularly, the invention relates to the bicycle wherein a crank lever is arranged between a sprocket and a pedal lever to transmit force applied to the pedal lever to the sprocket and the oscillating fulcrum point of the pedal lever is slidable and wherein a sliding part is provided with a dust-resistant means to prevent dust and the like from being entered therein and to remove the dust, if entered, therefrom.

2. Related Art

The conventional bicycle is operated such that the crank-like pedals fixed at both sides of a shaft of the sprocket with a phase difference of 180° are stepped on by a rider. The pedal lever is rotated around the shaft of the sprocket to attain rotating force of the sprocket and this rotating force of the sprocket is transmitted to the rear wheel through the chain.

However, in recent development of the bicycle, there has been proposed to provide a bicycle having a driving force generating device with an oscillating fulcrum point, whereby the rider is less fatigued with a riding as compared with the conventional bicycle, and desired propulsion force can be attained.

FIG. 1 schematically shows a configuration of the related art bicycle having the driving force generating device with an oscillating fulcrum point. In FIG. 1, a bicycle 60 having the rotating force transmitting mechanism with the oscillating fulcrum point is constructed such that a front wheel 61 acting as a moving wheel and a rear wheel 62 acting as a driving wheel are attached to a pair of delta-shaped frames 63, 64; a handle 65 is attached to a front frame 63; and a saddle 66 is fixed to a rear frame 64.

A wheel shaft 61a of the front wheel 61 is rotatably attached to extremity ends of a fork section 67a formed at the lower part of a handle frame 67. Connecting portion 63a constituting the front frame 63 is extended longitudinally in a reverse direction to a direction that the bicycle is headed, from a holding part 63c holding the handle frame 67 rotatably.

Connecting portion 63b also constituting the front frame 63 is extended in a rearward and downwardly slanting direction from the holding part 63c. The extremity ends of these connecting portions 63a, 63b are connected to a saddle frame 64c. The saddle frame 64c constitutes the rear frame 64 and is substantially in parallel with the handle frame 67. The saddle 66 is fixed to this saddle frame 64c.

Respective connecting portions 64a and 64b constituting the rear frame 64 are extended from the connecting portions 63a and 63b. The extremity ends of these connecting portions 64a, 64b are connected to each other to hold the wheel shaft 62a of the rear wheel 62 horizontally. Respective gears 75R and 75L (not shown) are attached and fixed to both ends of the wheel shaft 62a. FIG. 1 illustrates the configuration of the bicycle in which only the gear 75R at the right side toward a direction which a bicycle is headed, is shown.

The gear 75R is engaged with a gear train, not shown, and the crank 76R is fixed for transmitting its rotating force to the gear 75R through the gear train. A crank pin 77R is fixed to a position displaced in respect to a shaft 78R of the crank 76R. A right side pedal lever 72R holds rotatably the crank pin 77R so that the crank 76R may be rotated with the crank pin 77R.

The right side pedal lever 72R attaches a right side pedal 71R rotatably at a front end thereof. The pedal lever 72R attaches a roller 73R pivotally at a rear end thereof. The roller 73R is freely slid in a sliding part 74R formed near the wheel shaft 62a.

The pedal lever 72R acts as a lever oscillating upwards and downwards with the roller 73R pivoted at the pedal lever 72R being applied as a fulcrum point.

When the rider steps on the pedal 71R acting as a force applying point, the pedal 71R is moved in a counter-clockwise direction along a locus S approximating to a flat ellipse shape. At the same time, the pedal lever 72R is moved upwards and downwards in a predetermined angle with the roller 73R being applied as a fulcrum point.

This motion allows the crank 76R to rotate in a counter-clockwise direction around the shaft 78R through the crank pin 77R acting as a lever force applying point of the pedal lever 72a. At this time, the roller 73R acting as a fulcrum point for the pedal lever 72R is slid (moved) laterally within the sliding part 74R.

While the crank 76R is rotated, the rotating force of the crank 76R is transmitted to the gear 75R through the gear train. A clockwise directional rotation of the gear 75R causes the wheel shaft 62a of the rear wheel 62 to rotate for obtaining propulsion force of the bicycle 60. The propulsion force enables the bicycle 60 to run.

Since a left-side pedal lever 72L (not shown) is provided with the same driving force transmitting mechanism as that of the right side pedal lever 72R described above, a rider steps on the pedals 71R and 71L (not shown) alternatively by his (her) right and left feet to obtain propulsion force for the bicycle 60. Thereby, the bicycle 60 may run.

In the configuration of the aforesaid bicycle 60, a sliding part 74R formed on an end of the connecting portion 64b, is opened. Therefore, the foreign particles such as dust are prone to enter the sliding part 74R when the bicycle 60 is set outside or it is fallen to the ground. Entering of the foreign particles causes the sliding part of bicycle 60 to be injured. The foreign particles in the sliding part cause a faulty locus Q of motion of the pedal of the bicycle 60.

SUMMARY OF THE INVENTION

The object of the present invention is to provide a bicycle in which a sliding part is provided with a dust-resistant means to keep foreign particles such as dust from entering the sliding part and to remove the foreign particles, if entered, therefrom so that a smooth locus Q of motion of the pedal can be assured.

In carrying out the invention in one preferred mode, we provide a bicycle comprising a frame constituting a chassis, a steering means attached to the frame, a seat means for seating a rider attached to the frame, a pair of moving wheels rotatably arranged at the frame on a front side and a rear side thereof, said rear moving wheel acting as a driving wheel, a sprocket arranged near a bottom bracket point in the frame, driving force transmitting means for transmitting rotating force of the sprocket to the rear moving wheel, a pair of pedal levers having a phase difference of 180° with respect to each other to oscillate alternatively up and down, a crank lever arranged between the sprocket and the pedal lever so as to transmit force of the pedal lever to the sprocket, a sliding part for acting as an oscillating fulcrum point of the pedal lever and dust-resistant means provided with the sliding part.

A sliding pin arranged at one end of the pedal lever is slid within the sliding part while the pedal lever is oscillated. The force accompanied by the oscillation of the pedal lever is transmitted to the rear wheel through the sprocket.

In the present invention, force applied to the pedal by the rider is transmitted to the rear wheel under utilization of the crank lever, the sprocket and the chain. The force of the pedal lever is transmitted to the sprocket through the crank lever. The oscillating fulcrum point of the pedal lever is moved, not fixed, laterally in the sliding part.

As the pedal lever is stepped on by the rider, the oscillating fulcrum point is moved laterally, so that even when the locus of motion of the pedal is different in reference to the first half period (from the upper dead center to the lower dead center) and the second half period (from the lower dead center to the upper lower center), a smooth motion of the pedal is obtained.

The sliding part is provided with dust-resistant means such as a cover to keep the smooth motion of the pedal without a hitch. The dust-resistant means keeps foreign particles such as dust from entering the sliding part and removes the foreign particles, if entered, from the sliding part. If the foreign particles are prone to enter the sliding part of bicycle 60 when the bicycle 60 is set outside or it is fallen to the ground, the sliding part is not injured by the foreign particles and a faulty locus Q of motion of the pedal of the bicycle 60 does not occur.

A further understanding of the nature and advantages of the invention may be realized by reference to the following portion of the specification and drawings.

DESCRIPTION OF THE PREFERRED EMBODIMENT

Figure 1:
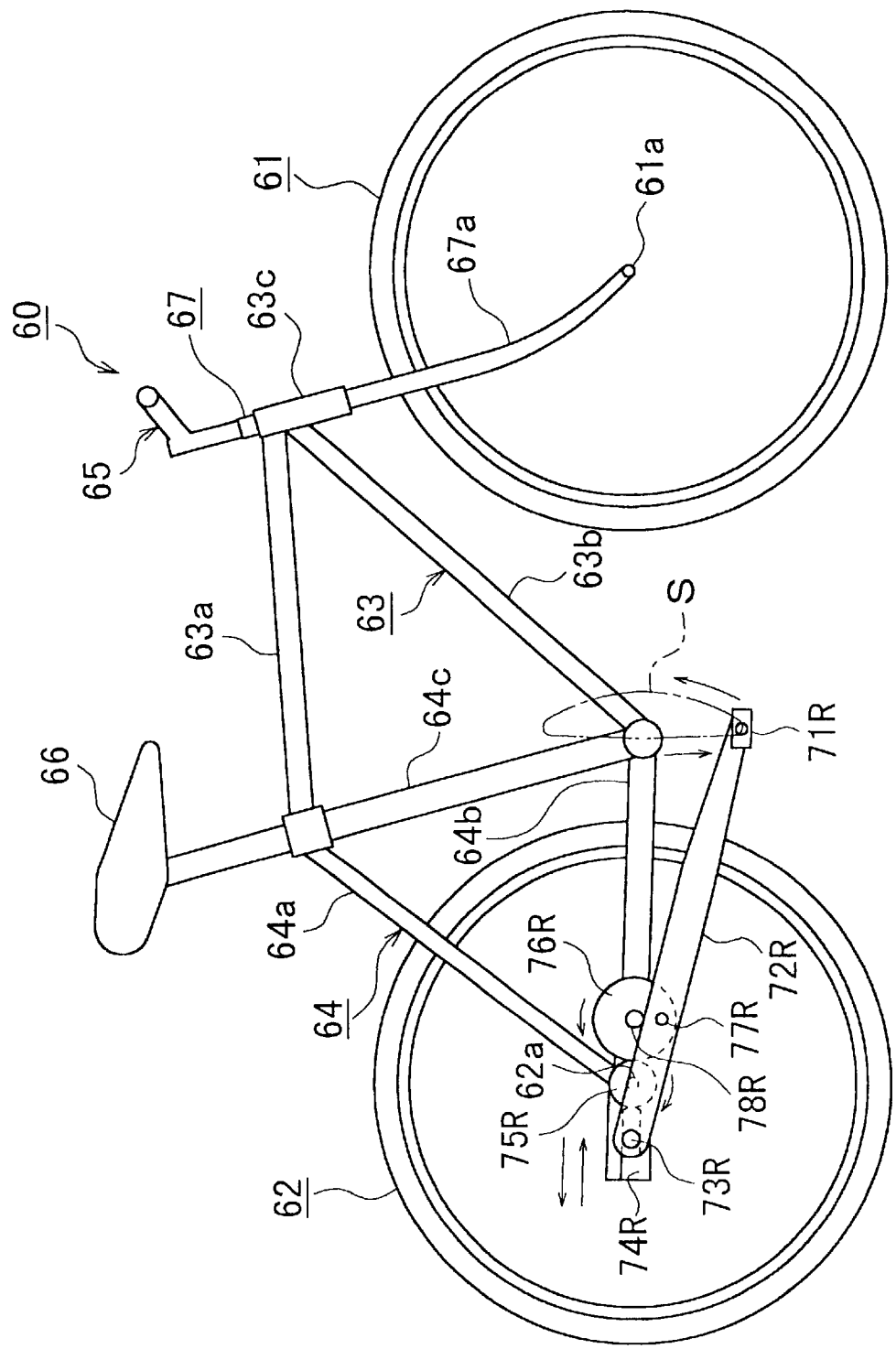
FIG. 1 is a side elevational view illustrating a configuration of a bicycle of related art.
Figure 2:
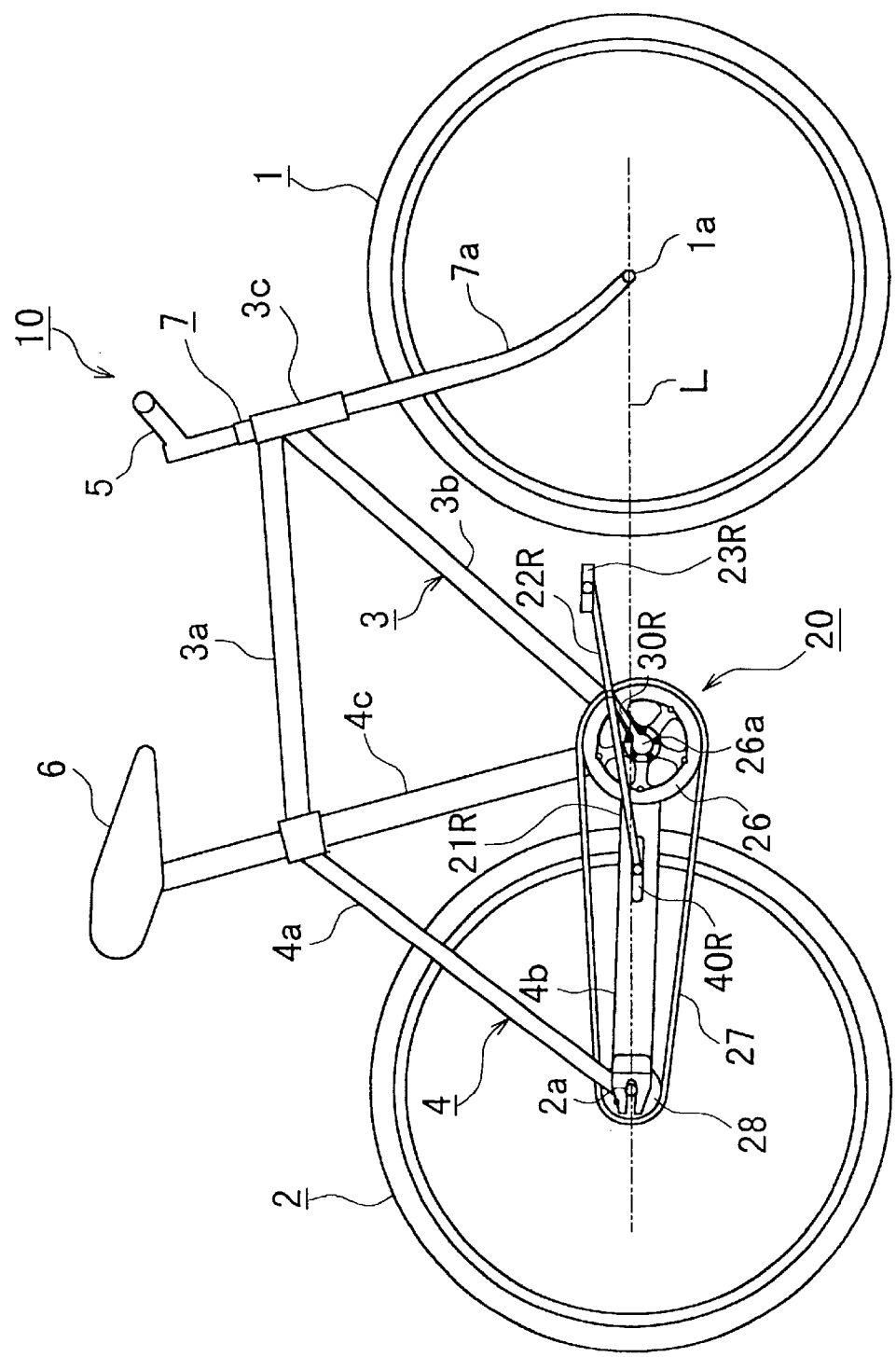
FIG. 2 is a side elevational view illustrating a configuration of a bicycle having rotating force transmitting mechanism with an oscillating fulcrum point, as a preferred embodiment of the invention.

Referring now to the drawings, some preferred embodiments of the present invention will be described. FIG. 2 shows a configuration of a bicycle 10 using a rotating force transmitting mechanism 20 with an oscillating fulcrum point, as a preferred embodiment.

As shown in FIG. 2, the bicycle 10 is constructed such that a front moving wheel 1 and a rear moving wheel 2 acting as a driving wheel are connected by a pair of delta-shaped frames 3, 4. A handle 5 is also fixed on the front frame 3 and a saddle 6 is fixed on the rear frame 4.

A wheel shaft 1a of the front wheel 1 is rotatably attached to an extremity end of a fork segment 7a formed at a lower part of a handle frame 7. The handle 5 acting as a steering device is attached to an upper part of the handle frame 7.

Respective connecting portions 3a, 3b constituting the front frame 3 are extended laterally and along an inclined downward direction from a holding section 3c rotatably holding the handle frame 7. The extremity ends of these connecting portions 3a, 3b are coupled to a saddle frame 4c constituting the rear frame 4. The saddle 6 is fixed to the saddle frame 4c so that a riding-on height of a bicycle rider can be properly adjusted as necessary. The saddle frame 4c is substantially in parallel with the handle frame 7.

Respective connecting portions (connecting frames) 4a, 4b constituting the rear frame 4 are extended along an inclined downward direction and laterally from the two connecting portions 3a, 3b. The extremity ends of these connecting portions 4a, 4b are connected to each other to hold a wheel shaft 2a of the rear wheel 2 in a horizontal state. A gear 28 is fixed to the wheel shaft 2a of the rear wheel 2. The force of a sprocket 26 generated by oscillations of a pedal lever 22R is transmitted to the gear 28 through a chain 27. In the example shown in FIG. 2, a shaft 26a of the sprocket 26 is set at a bottom bracket point (a crossing point between the frames 3b and 4c).

In this case, the pedal lever 22 is a linear lever (a pedal arm). A pair of pedal levers 22R and 22L are fixed to the right and left sides of the sprocket 26 with a phase difference of 180°, respectively.

FIG. 2 illustrates a case that the sprocket 26 is fixed on the right side toward a direction that the bicycle is headed, in respect to each of the frames 3, 4. An end of a crank lever (a crank arm) 30R is fixed to the shaft 26a of sprocket 26 and the other end thereof is rotatably hold to the pedal lever 22R.

The pedal lever 22R is equipped with the pedal 23R at an extremity end thereof, and fixes a sliding pin 42R (or a sliding roller) on the other end thereof.

When the rider steps on a pedal 23 (23R in the case shown in FIG. 2), force applied to the pedal lever 22R is transmitted to the sprocket 26 through this crank lever 30R. The sliding pin 42R acts as an oscillating fulcrum point.

Oscillating mechanism in a case that the frame 4*b* is a plate like member will be explained.

Figure 3:
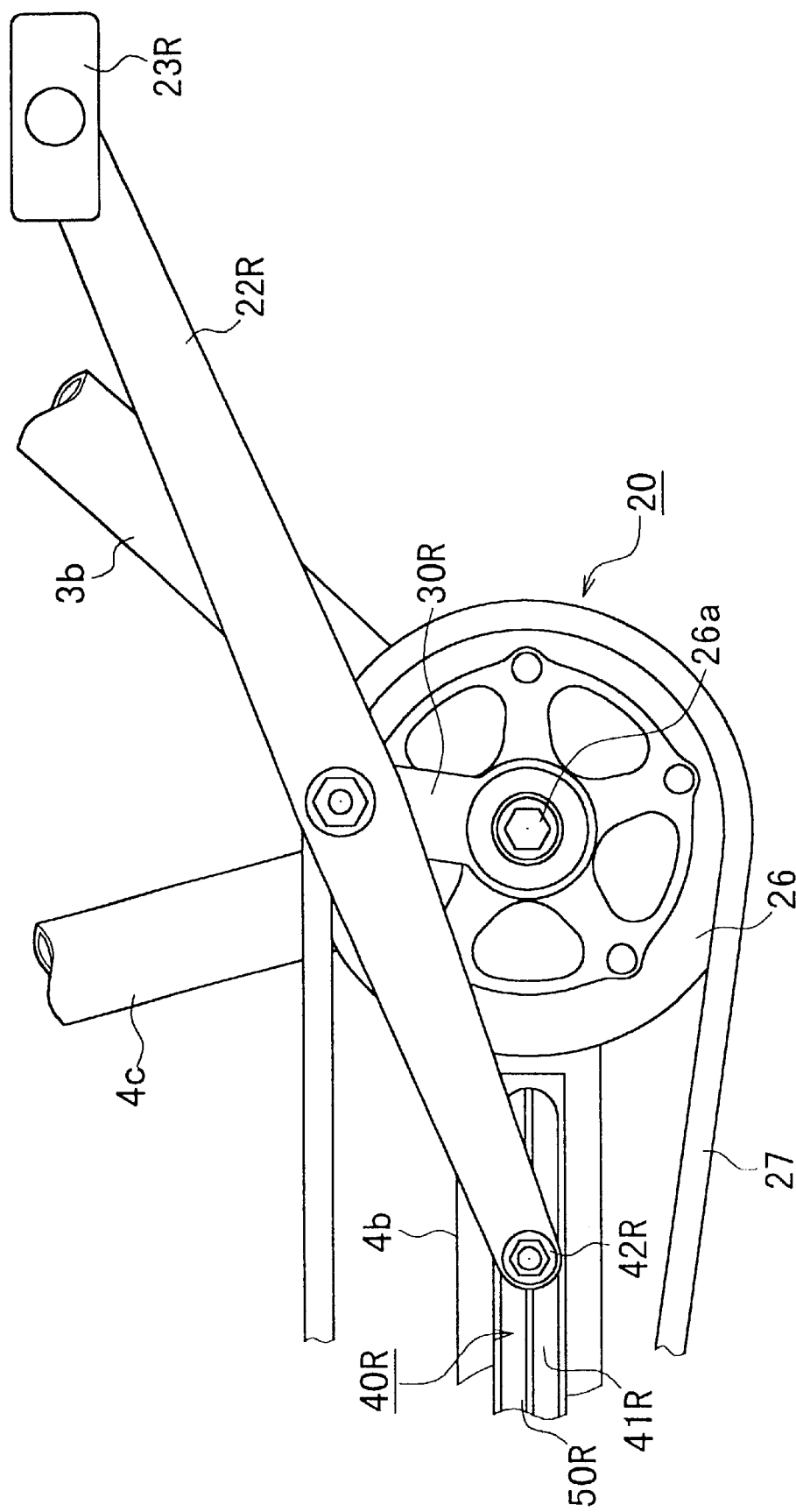
FIG. 3 is a partially enlarged side elevational view illustrating a portion near the rotating force transmitting mechanism.

As shown in FIG. 3, the frame 4*b* is provided with a sliding part 40R. The sliding part 40R is arranged on an outside of the frame 4*b* and placed so as to be aligned with wheel shafts 1*a* and 2*a* of the front and rear wheels 1 and 2 (see an imaginary line L connecting said wheel shafts 1*a* and 2*a*, as shown in FIG. 2). The sliding part 40R comprises a housing of a rectangular solid in which a sliding groove 41R for sliding the sliding pin 42R is made. The sliding part 40R is opened at its one side.

The sliding part 40R is made of an oil-less metal and so on. Thereby, a sliding friction of the sliding pin 42R can be reduced. The sliding part 40R may be formed in one piece with the frame 4*b* or be welt to it.

The sliding pin 42R (or the sliding roller) attached to said other end of the pedal lever 22R is engaged with the sliding groove 41R with a slight clearance and is slid laterally within the sliding groove 41R as a guide.

To reduce the sliding friction, both the sliding pin 42R and the sliding part 40R may be plated. The plating process such as electroless plating process to perform film containing low phosphate and low boron with good qualities concerning high hardness, abrasion resistance, heat resistance, good lubrication, shock resistance, etc., may be utilized (for example, plated articles, "Kaniboron" plated in accordance with the plating process by Japan Kanigen Corporation may be used). The sliding pin 42R may be made of engineering plastic in addition to metal.

The sliding part 40R is provided with dust-resistance means 50R. The Dust-resistance means 50R keeps foreign particles such as dust from entering the sliding part 40R.

The foreign particles are prone to enter the sliding part of bicycle when the bicycle is set outside or it is fallen to the ground. The foreign particles entered in the sliding part 40R cause the sliding part 40R to be injured and a faulty oscillation of pedal lever 22R to occur. Rainwater penetrated into the sliding part 40R is prone to form rust in the sliding groove 41R so that the sliding pin 42R cannot slide smoothly in the sliding groove 41R.

Figure 4:
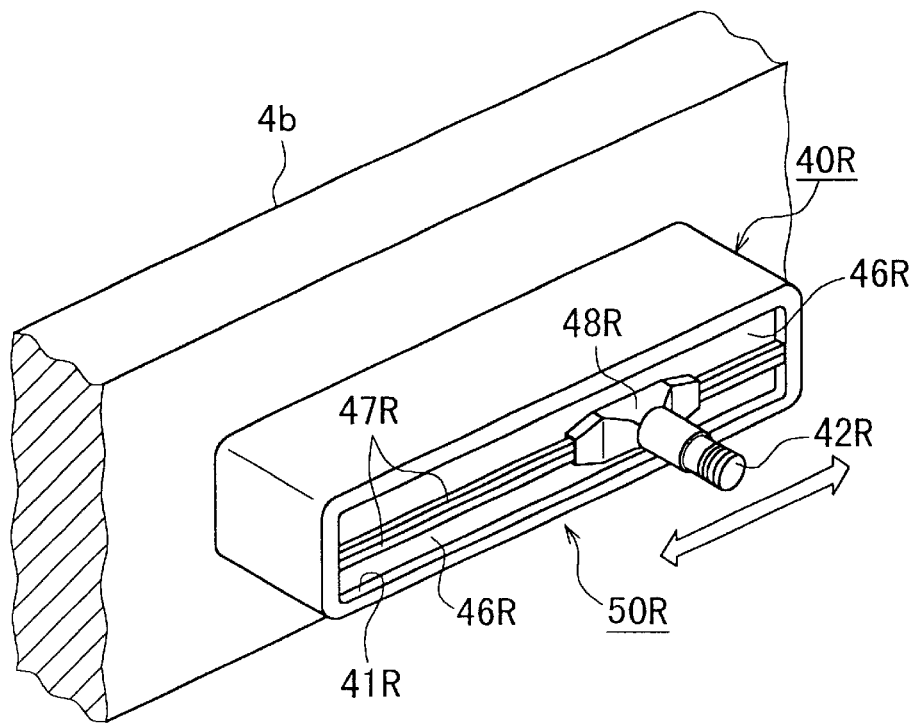
FIG. 4 is a perspective view of a sliding part as a preferred embodiment of the invention.

FIG. 3 shows dust-resistant means 50R as an embodiment of the invention. FIG. 4 shows a detailed configuration thereof.

The dust-resistant means 50R is formed as a fastener. Two dust-proof cloths 46R, 46R are provided so as to cover the opening portion of the sliding part 40R. Two dust-proof cloths 46R, 46R respectively have a strip 47R (47R*a*, 47R*b*) of interlocking one with another. The dust cloths 46R, 46R are pulled together to interlock the strips 47R*a*, 47R*b* thereof and pulled apart to open them, by movement of a zipper member 48R.

Figure 5:
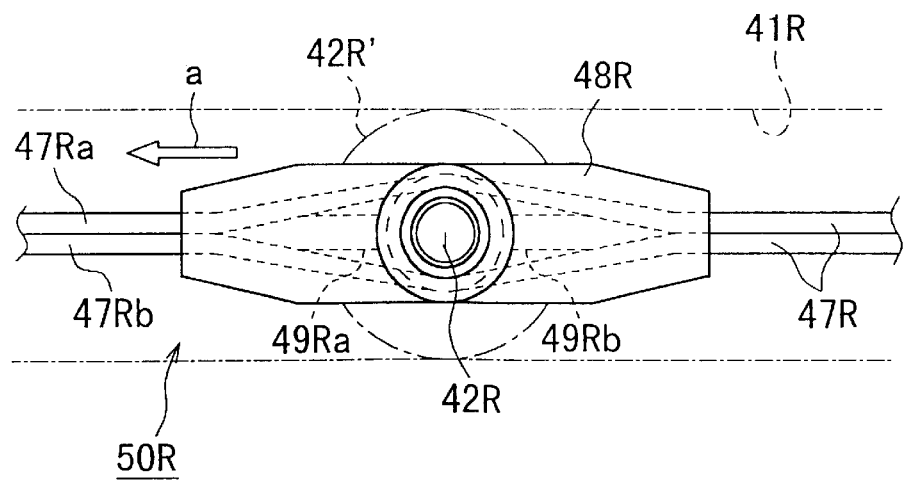
FIG. 5 is a front elevational view of the sliding part as shown in FIG. 4.

The zipper member 48R has a pair of projections 49R*a*, 40R*b* connected with the sliding pin 42R as shown in FIG. 5 (Apin itself engaged within the sliding groove 41R is referred to 42R' in FIG. 5).

As shown in FIG. 5, when the sliding pin 42R slides in a direction of an arrow "a", the forward projection 49R*a* sets the strips 47R*a*, 47R*b* apart to open the dust cloths 46R, 46R. This allows the sliding pin 42R to further slide in the direction of the arrow "a". The rear projection 49R*b* and a rear portion of the zipper member 48R interlock the strips 47R*a*, 47R*b* together to close the dust cloths 46R, 46R again. Thus, the strips 47R*a*, 47R*b* can be set apart and interlocked inside the zipper member 48R. They are always kept interlocked outside it as shown in FIGS. 4 and 5. The dust cloths 46R, 46R can always cover the sliding groove 41R. This keeps dust and the like from entering the sliding groove 41R.

The crank lever 30R is attached to the pedal lever 22R so that the crank lever 30R is positioned near the upper dead center thereof when the pedal 23R is positioned at the uppermost position of motion. At the same time, the sliding part 40R is set on the frame 4*b* so that the pedal lever 22R is engaged with the sliding groove 41R through the sliding pin 42R positioned at a substantial central part (a central point) of the sliding groove 41R.

Accordingly, a right side from the central part of the sliding part 40R is used for sliding the sliding pin 42R when a locus of motion of the pedal 23R shows the first half period (a pedal period) ranging from the uppermost position to the lowermost position. In turn, a left side of the sliding part 40R is used for sliding the sliding pin 42R when a locus of motion of the pedal 23R shows the second half period ranging from the lowermost position to the uppermost position.

In addition, since FIG. 2 shows a configuration in which the gear 28 is arranged at the right side toward a direction that the bicycle 10 is headed, the rotating force transmitting mechanism 20 such as the pedal lever 22R, the crank lever 30R and the sprocket 26, is shown as being arranged at the right side of the bicycle 10. However, the rotating force transmitting mechanism 20 maybe arranged at the left side toward the direction that the bicycle 10 is headed.

In the example shown in FIG. 2, to the left side of the bicycle 10 toward the direction that the bicycle 10 is headed, are arranged the members such as a pedal lever 22L, a crank lever 30L and a sliding part 40L exclusive of the sprocket 26 and the chain 27 from the rotating force transmitting mechanism 20. Each of the detailed configuration and the illustration of these members will be eliminated.

When the rotating force transmitting mechanism 20 is constructed as described above, stepping-on force against the pedal 23R is transmitted to the sprocket 26 through the pedal lever 22R and the crank lever 30R. Since the chain 27 acting as a driving force transmitting means is placed between the sprocket 26 and the rear wheel gear 28, the rotating force of the sprocket 26 is transmitted to the gear 28. Thereby, the rear wheel 2 is driven to generate propulsion force for the bicycle 10.

Figure 6:
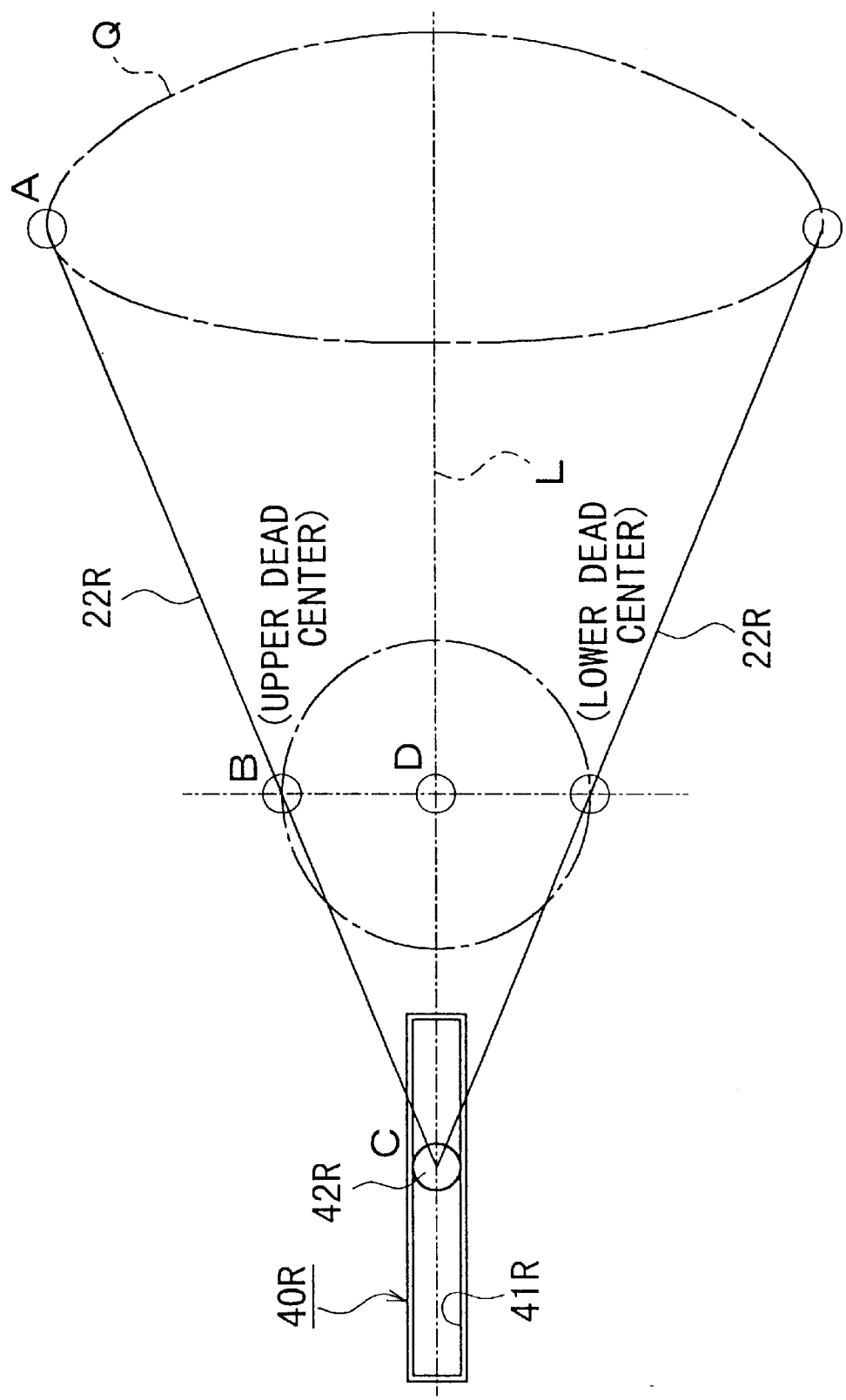
FIG. 6 is a view showing a locus of motion of a pedal of the bicycle in the preferred embodiment as shown in FIG. 2.

FIG. 6 shows one example of a locus Q of motion of the pedal 23R when stepping-on force is applied to the pedal 23R and the pedal 23R is reciprocated in one circle. The locus Q of motion of the pedal 23R shows a circular motion or a near linearly reciprocation motion in response to a position of a crossing point between the crank lever 30R and the pedal lever 22R, and the length of the crank lever 30R.

At present, it is assumed that the locus Q of motion is changed like a circular motion→an ellipse motion→a linear motion in response to a ratio of each of the lengths of parts of the pedal lever 22R (AB : BC) when each of the points A, B, C and D is defined as those shown in FIG. 6. Here, A is defined as a position of the pedal 23R; B is defined as the crossing point between the crank lever 30R and the pedal lever 22R; C is defined as a position of an end of the pedal lever 22R, namely, the sliding pin 42R; and D is defined as the fixed position of the crank lever 30R and the shaft 26*a* of the sprocket 26. It has been found that, in the case of AB: BC=BC: BD=2:1, the pedal 23R shows a locus Q of an approximate linearly reciprocation motion.

FIG. 6 shows an example corresponding to an intermediate case in which a locus Q of motion approximates to the ellipse motion. It has been found that even if the locus Q approximates to an elliptical motion, the pedal 23R moves along the substantial elliptical locus of motion of the first half period thereof, and in turn moves along the substantial linear locus of motion of the second half period thereof except the upper and lower dead centers.

A certain study has been performed to check what degree of numerical value is practically attained. When the rider has physical size, for example, a height of about 165 to 170 cm, the moving wheels 1, 2 having the diameters of approximately 20 to 26 inches are used. In this case, it is appropriate that some numerical values (AB=200 to 300 mm, BC=100 to 200 mm, BD=50 to 100 mm) are applied. At this time, it is sufficient that a sliding length of the sliding part 40R is about 100 to 250 mm.

Figure 7:
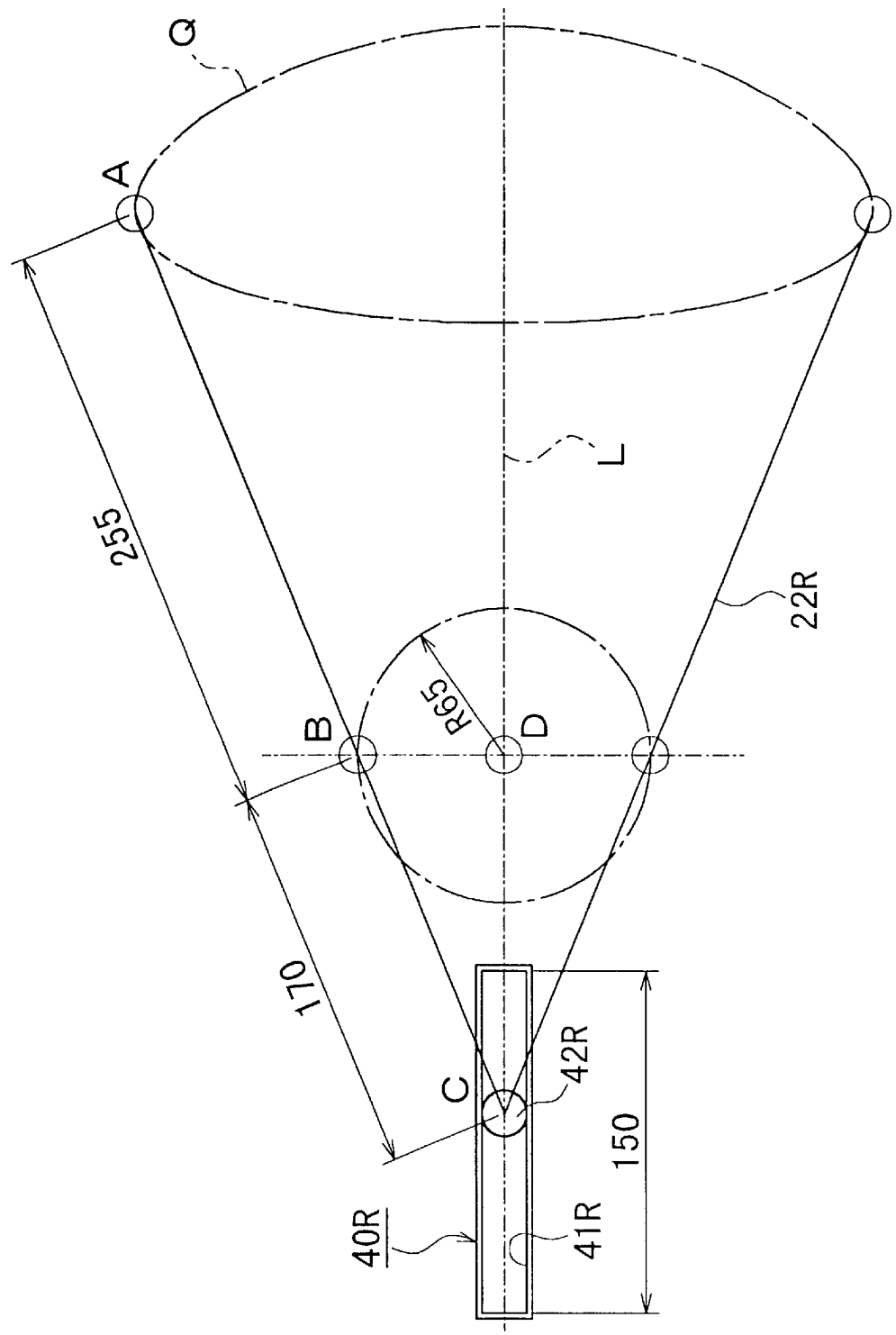
FIG. 7 is a view showing a relationship in size of each of the parts of the rotating force transmitting mechanism.

An experiment was carried out with values of AB=255 mm, BC=170 mm and BD=65 mm as indicated in FIG. 7. The sliding length at that time was 150 mm. At this time, the locus became an ellipse locus shown in FIG. 6.

As described above, stepping-on force applied to the pedal 23R causes the sprocket 26 to rotate while the oscillating fulcrum point of the pedal lever 22R is being slid laterally. Further, this rotating force of the sprocket 26 is transmitted to the rear wheel 2 through the chain 27 and then, the bicycle 10 can be moved forward.

Similar propulsion force may also be attained with the stepping-on force applied to the opposite side pedal 23L (not shown). Although a part of the locus of these pedals 23 (23R, 23L) shows an ellipse one, the ellipse has a long major axis so that the entire locus Q of motion approximates to a linear.

As a result thereof, the pedal 23 may easily be stepped on. In addition, since stepping-on force on the pedal 23 becomes strong, a rotational torque caused by the pedal 23 is increased and the bicycle 10 can be run with effect.

In addition, since the oscillating fulcrum point of the pedal lever 22 (22R, 22L) is a horizontal sliding type, not a fixed point type, a smooth oscillation of the pedal 23 is obtained when the pedal is moved in one cycle. Incidentally, when the oscillating fulcrum point of the pedal lever 22 is fixed, it has been found that the pedal 23 can not be moved.

Subsequently, other preferred embodiments of the bicycle 10 in accordance with the present invention will be described.

Figure 8:
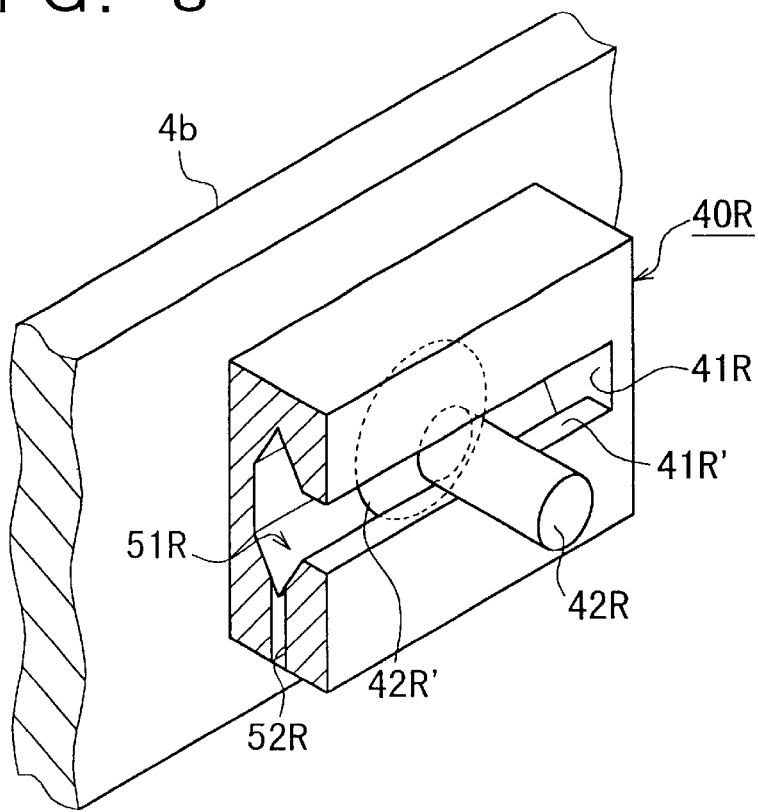
FIG. 8 is an enlarged perspective view showing a sliding part of another preferred embodiment of the invention, partly in section.
Figure 9:
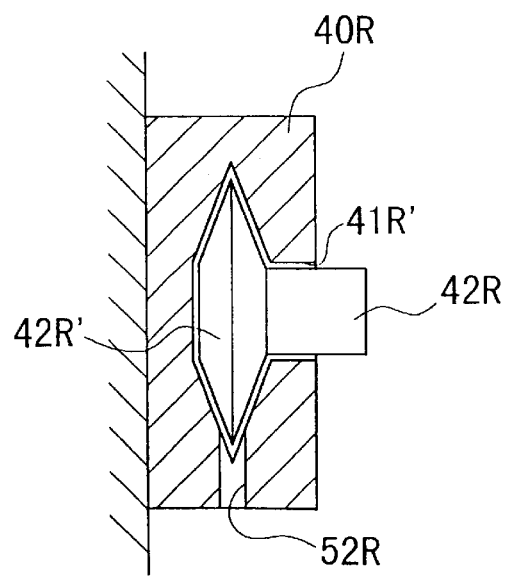
FIG. 9 is a sectional side view of the sliding part as shown in FIG. 8.

In the embodiment as shown in FIG. 8, the sliding part 40R is provided with an opening 41R' communicated to the sliding groove 41R. The sliding pin 42R has an enlarged portion 42R' at its tip, which has a hexagonal section. The sliding groove 41R is also formed as a hexagonal slightly larger than the enlarged portion 42R'. The sliding pin 42R passes through the opening 41R', as shown in FIGS. 8 and 9. The enlarged portion 42R' is slidably engaged within the sliding groove 41R with a slight clearance.

At least one hole 52R is bored at a set portion (for example, at a portion corresponding to a midpoint of the sliding groove 41R) on a lower surface of the sliding part 40R and communicated with a narrow bottom portion 51R of the sliding groove 41R. The hole 52R allows the dust or the like to drop therefrom to outside of the sliding part 40R accompanied by a slide of the enlarged portion 42R'. Therefore, about 3 through 5 mm are sufficient for a diameter of the hole in consideration of diameters of the foreign particles such as sand.

Since the sliding groove is used in the opened state, dust and the like sometimes enter the sliding groove 41R in use or at a stop condition thereof. In this case, the foreign particles such as dust entered the sliding groove 41R naturally are dropped to the narrow bottom portion 51R of the sliding groove 41R. Accompanied by a slide of the enlarged portion 42R' within the sliding groove 41R, the foreign particles are moved in and along the narrow bottom portion 51R. The hole 52R positioned at a position on its way of the movement, causes the foreign particles to drop therefrom to the outside of sliding groove 41R.

Namely, the enlarged portion 42R' of the sliding pin 42R cleans the sliding groove 41R free of the foreign particles every time the enlarged portion 42R' is slid in the sliding groove 41R. Therefore, when the foreign particles enter the sliding groove 41R, a smooth movement of the sliding pin 42R can remain.

Number of holes 52R and their bored positions are further conceivable in addition to the ones of the embodiment as shown in FIG. 8. For example, two holes may be positioned at two positions near the right and left end portions in addition to a midpoint of the sliding groove 41R. Thus, when the foreign particles enter the sliding groove 41R, they can be removed from the sliding groove 41R through the above holes every time the sliding pin 42R is slid right or left.

Figure 10:
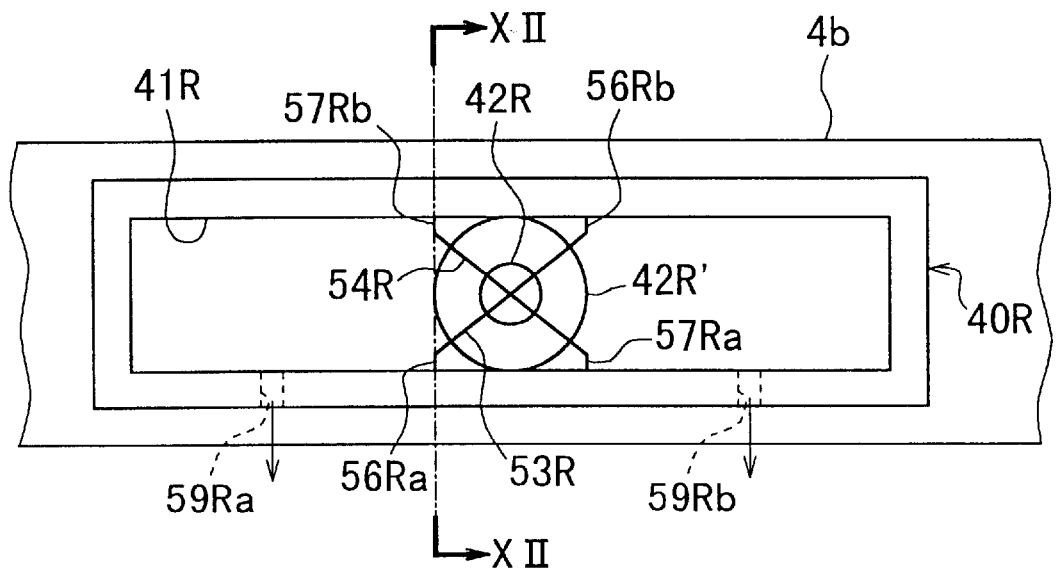
FIG. 10 is a front elevational view showing a sliding part of still another preferred embodiment of the invention.
Figure 11:
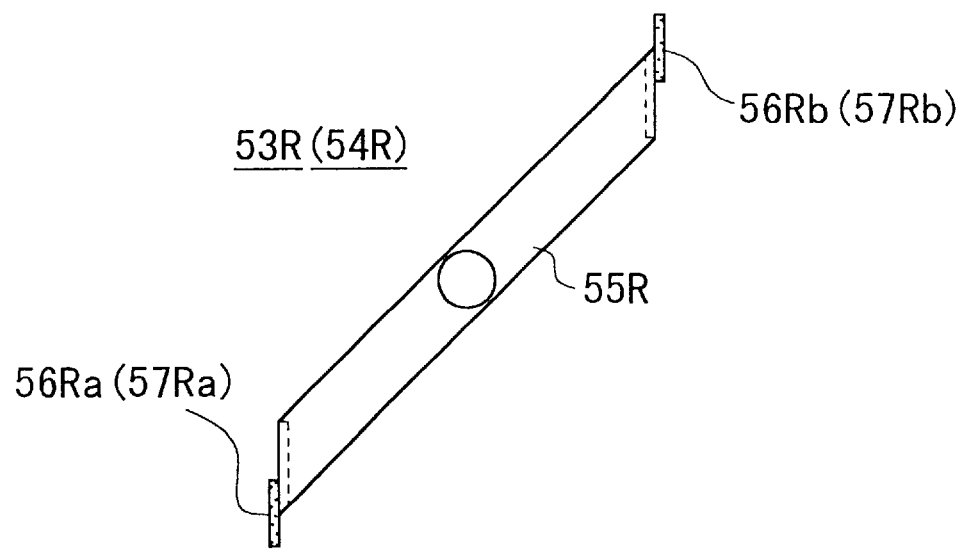
FIG. 11 is a front view of a brush used in the sliding part as shown in FIG. 10.

FIG. 10 shows a sliding part of another preferred embodiment of the invention. In the embodiment, brush members are used as a dust-resistant means. A pair of brush members 53R, 54R are used for removing from an inner wall (upper wall and lower wall) of the sliding groove 41R the dust and the like attached thereto, as shown in FIG. 10.

Each of the brush members 53R, 54R has the same constitution as each other. The brush member 53R is formed so that both ends of a thin spring plate 55R are folded obliquely and brushes 56R$a$, 56R$b$ of, for example, sponge are attached to the folded portion of spring plate 55R to project a part thereof from spring plate 55R.

Figure 12:
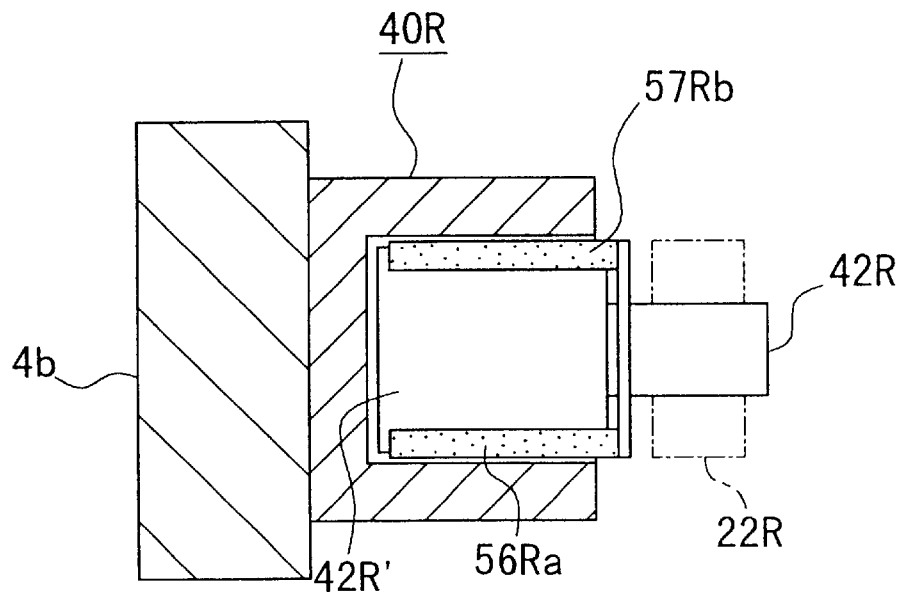
FIG. 12 is a sectional view of the sliding part taken on line XII—XII of FIG. 10.

A center portion of the spring plate 55R is fixed to the sliding pin 42R as shown in FIG. 12. The spring plate 55R is fixed obliquely to the sliding pin 42R so that both of the brushes 56R$a$, 56R$b$ can be slidably contacted with the upper wall and the lower wall of the sliding groove 41R simultaneously, as shown in FIG. 10.

The other brush member 54R is fixed to the sliding pin 42R so that it intersects the brush member 53R at right angles.

Further, a plural of holes, two holes 59R$a$, 59R$b$ in this embodiment, are bored on the lower portion of the sliding part 40R and they are communicated with the sliding groove 41R. In this embodiment, 3 through 5 mm are also suitable for the diameters of holes 59R$a$, 59R$b$.

Since the sliding groove 41R is also used in the opened state in this embodiment, the foreign particles such as dust sometimes enter the sliding groove 41R. If so, the foreign particles entered the sliding groove 41R may be removed from the sliding groove 41R to the outside through holes 59R$a$, 59R$b$, accompanied by a movement of the enlarged portion 42R' within the sliding groove 41R with the brushes 53R, 54R sliding the inner wall of the sliding groove 41R.

Therefore, this frees the enlarged portion 42R' from the foreign particles to cause it to move in the sliding groove 41R. The sliding groove 41R and the enlarged portion 42R' of the sliding pin 42R are not injured, and a smooth slide of the sliding pin 42R may remain.

Figure 13:
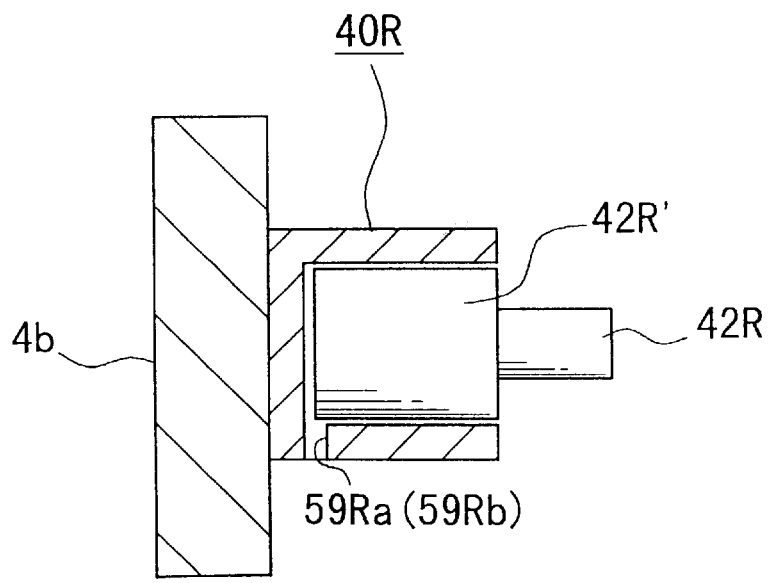
FIG. 13 is a sectional view showing a sliding part of further preferred embodiment of the invention.

FIG. 13 shows a sliding part of still another preferred embodiment of the invention. In this embodiment, brush members 53R, 54R are omitted. Only holes 59R$a$, 59R$b$ are used for removing dust and the like. In such an embodiment, the sliding groove 41R may be sufficiently cleaned.

Although a plate-like member is used as the frame 4b in the above embodiments, FIGS. 14 through 18 show a sliding part of further preferred embodiment wherein the invention applies to a bicycle used pipe frames as the frame 4b.

Figure 14:
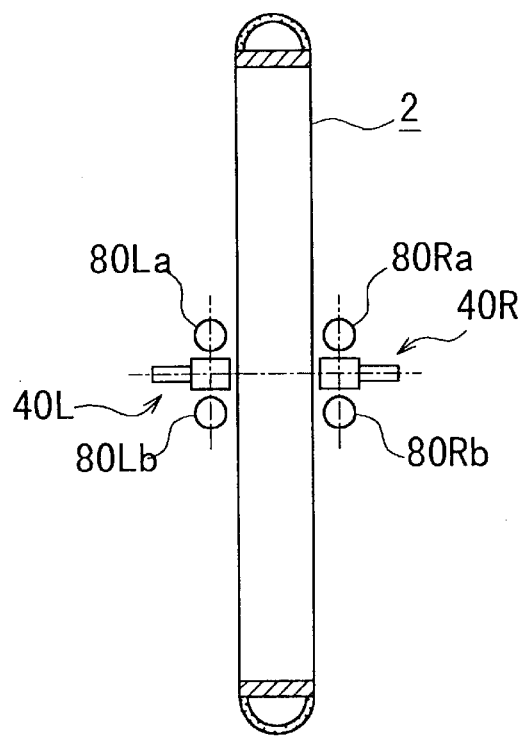
FIG. 14 is a view indicating a relationship between a rear wheel and a frame in connection with a sliding part of still further preferred embodiment of the invention.

FIG. 14 shows the relationship between the rear wheel 2 and the frames 4b (80R, 80L). In this embodiment, each of the frames 4b is formed so that two pipe frames 80Ra, 80Rb (80La, 80Lb) are arranged on upper and lower positions. The above sliding part 40R (40L) is arranged and fixed between the pipe frames 80Ra, 80Rb (80La, 80Lb).

Figure 15:
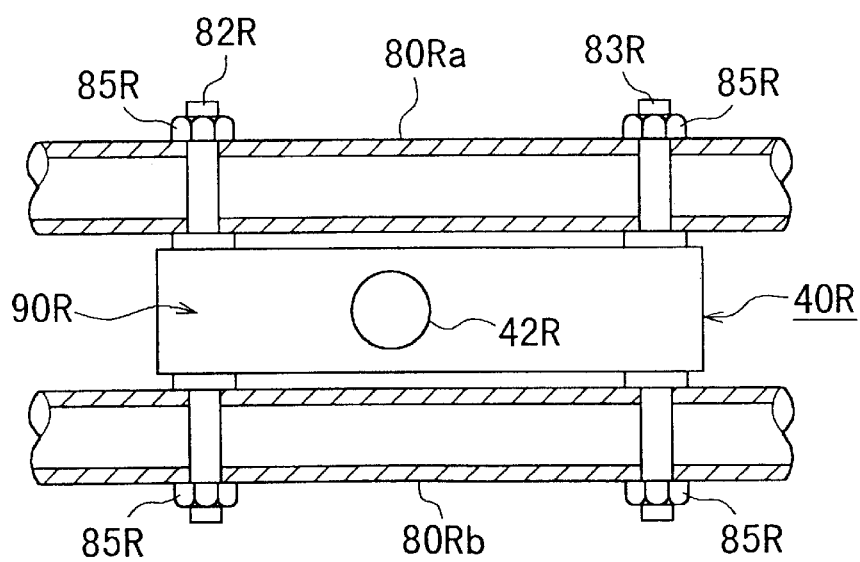
FIG. 15 is a view showing a state that the sliding part of FIG. 14 is attached to the frame, partly in section.

FIG. 15 is a partly sectional view showing a state that the sliding part 40R is attached to the frames 80Ra, 80Rb.

The sliding part 40R of rectangular solid shape is attached to the upper and lower pipe frames 80Ra, 80Rb with screw parts formed at opposite end portions of respective two rods passed through the pipe frames 80Ra, 80Rb and the sliding part 40R being screwed on by the nuts 85R.

Figure 16:
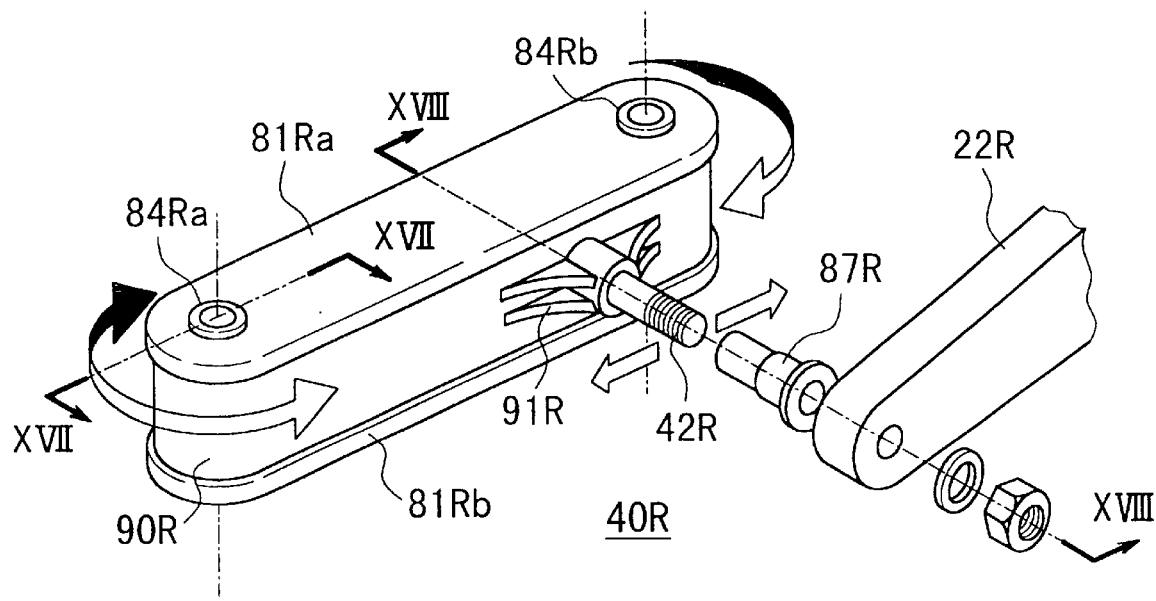
FIG. 16 is an exploded perspective view illustrating the sliding part as shown in FIG. 14.
Figure 17:
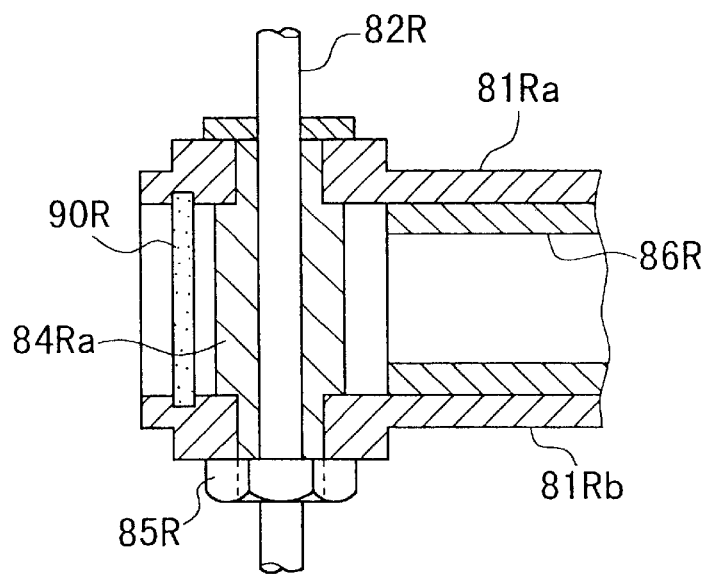
FIG. 17 is a sectional view of the sliding part taken on line XVII—XVII of FIG. 16.

The sliding part 40R (40L) is made of a pair of plate-like frames 81Ra, 81Rb arranged upwardly and downwardly, as shown in FIG. 16. The plate-like frames 81Ra, 81Rb are fixed to each other with a predetermined space therebetween by two sleeves 84Ra, 84Rb respectively positioned longitudinally. FIG. 17 shows an example of attaching state thereof. In this example, the screwed sleeve 84Ra is used for attaching the plate-like frames 81Ra, 81Rb and the nut 85R is used for tightening the screwed rod.

Figure 18:
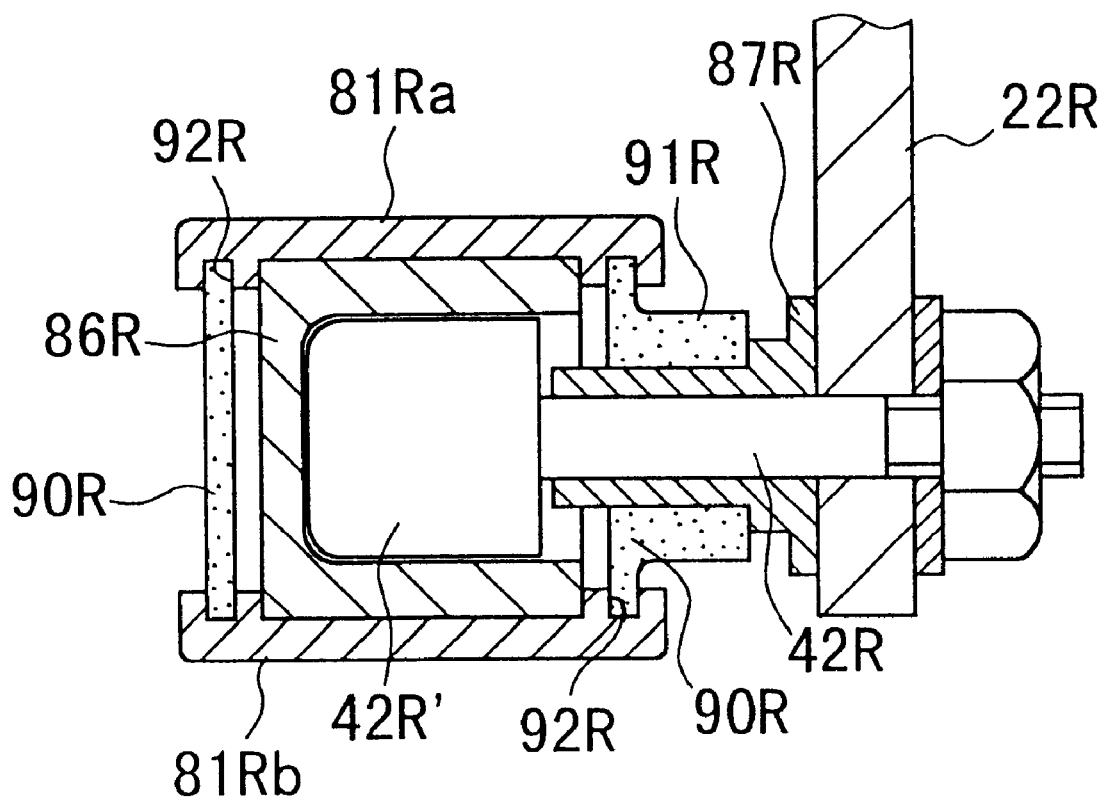
FIG. 18 is a sectional view of the sliding part taken on line XVIII—XVIII of FIG. 16.

A housing formed by the plate-like frames 81Ra, 81Rb includes a guide member 86R having a hollow section as shown in FIG. 18. The enlarged portion 42R' is slidably positioned inside the hollow portion of the guide member 86R. An end of the sliding pin 42R is fixed to the enlarged portion 42R'. The other end of the sliding pin 42R is fixed to the extremity end of the pedal lever 22R.

A dust-proof belt 90R is movably attached to the housing, the plate-like frames 81Ra, 81Rb so that the belt 90R encloses an inner space between said frames 81Ra and 81Rb. The belt 90R is slidably engaged with peripheral grooves 92R, 92R which are respectively formed on the opposed inner surfaces of the frames 81Ra, 81Rb. The belt 90R acts as a dust-proof means.

The sliding pin 42R passes through the belt 90R so that the sliding pin 42R and the belt 90 may slide. The belt 90R is reinforced at a periphery of the portion where the sliding pin 42R passes through, by strengthening boss 91R (see FIG. 16). The belt 90R is made of, for example, soft rubber to minimize sliding resistance. Further, the sliding resistance may be reduced by means of application of a lubricant into the peripheral grooves 92R.

Since the belt 90R keeps the dust or the like from entering the sliding part 40R, the enlarged portion 42R' of sliding pin 42R may always be slid smoothly. Since the belt 90R also keeps water such as rain from entering the sliding part 40R, this can provide a waterproof sliding part 40R.

In addition, as the driving force transmitting means in the aforesaid preferred embodiments, the chain driving system has been illustrated. However, it may be similarly applicable to a bicycle having a belt drive or a shaft drive driving system or the like. The present invention can be applied to a bicycle having an auxiliary driving means installed therein.

In accordance with the present invention, the rider of the bicycle steps on the pedal 23 so that the pedal lever 22 oscillates downwardly. The force applied to the pedal lever 22R is transmitted to the sprocket 26 through the crank lever 30 to cause the sprocket 26 to rotate. Then, the oscillating fulcrum point of the pedal lever 22 is moved, not being fixed, laterally within the sliding part 40. Rotating force of the sprocket 26 is transmitted to the rear wheel 2 through the chain 27, and then the bicycle 10 can be moved forward.

Further, when the pedal lever is stepped on, the oscillating fulcrum point is moved smoothly in a lateral direction. Even if the loci of rotating motion of the pedal at the first half period and the second half period are different to each other, the motion of the pedal becomes quite smooth.

Since the sliding part in the bicycle according to this invention is provided with the dust-resistant member, the bicycle can easily remove the foreign particles such as dust, if they enter the sliding part, therefrom by the dust-resistant member.

Further the bicycle according to this invention perfectly keeps foreign particles from entering the sliding part. As a result thereof, the sliding part such as the sliding groove and the sliding pin, is not injured by the foreign particles and a faulty locus Q of motion of the pedal of the bicycle 60 does not occur. Therefore, the motion of the pedal keeps quite smooth.

While the above is a complete description of the preferred embodiment of the invention, various alternatives, modifications and equivalents may be used. Therefore, the above description should not be taken as limiting the scope of the invention as defined by the appended claims.

What is claimed is:
1. A bicycle comprising:
    a frame constituting a chassis;
    a steering mechanism attached to the frame;
    a seat for seating a rider attached to the frame;
    a pair of moving wheels rotatably arranged at the frame on a front side and a rear side of the frame, said rear side moving wheel acting as a driving wheel;
    a pair of pedal levers having a phase difference of 180° with respect to each other to oscillate alternatively up and down;
    a pair of pedals operatively connected one each to said pair of pedal levers;
    a sprocket arranged near a bottom bracket point in the frame between said pair of pedals and said rear side wheel;
    driving force transmitting means for transmitting rotating force of the sprocket to the rear side moving wheel;
    a crank lever arranged between the sprocket and the pedal lever so as to transmit force of the pedal lever to the sprocket;
    a sliding part for acting as an oscillating fulcrum point of the pedal lever; and
    a dust-resistant enclosure provided with the sliding part, said dust-resistant enclosure comprising:
        a housing substantially enclosing said sliding part, said housing having an opening;
        two reclosable cover members disposed at said opening to close said opening;
        an interlocking interface between said two reclosable cover members, said interface remaining interlocked except where said sliding part extends therethrough; and a covering member associated with said sliding member, said covering member covering an unlocked portion of said interface where said sliding part extends therethrough, and said covering member interlocking the cover members at said interface downstream of said sliding part as said sliding part slides along said interface;

wherein a sliding pin arranged at one end of said pedal lever is slid within said sliding part as said pedal lever is oscillated, and wherein the force accompanied by the oscillation of said pedal lever is transmitted to said rear wheel through said sprocket.

2. The bicycle according to claim 1 wherein said frame extending between a bottom bracket point and the rear wheel includes a plate and a dust cover for covering said sliding part.

* * * * *